United States Patent [19]

Tanabe et al.

[11] Patent Number: 5,833,846
[45] Date of Patent: Nov. 10, 1998

[54] HIGH-PURITY WATER PRODUCING APPARATUS UTILIZING BORON-SELECTIVE ION EXCHANGE RESIN

[75] Inventors: Madoka Tanabe; Sakae Kaneko, both of Toda, Japan

[73] Assignee: Orango Corporation, Tokyo, Japan

[21] Appl. No.: 785,507

[22] Filed: Jan. 17, 1997

[30]   Foreign Application Priority Data

Jan. 17, 1996 [JP] Japan .................................. 8-005616

[51] Int. Cl.⁶ ..................................................... C02F 9/00
[52] U.S. Cl. ........................ 210/202; 210/259; 210/266; 210/284; 210/900
[58] Field of Search ................................. 210/683, 202, 210/257.2, 259, 266, 900, 284

[56]             References Cited

U.S. PATENT DOCUMENTS

| 3,870,033 | 3/1975 | Faylor et al. | 210/900 |
| 3,887,460 | 6/1975 | Ward et al. | 210/683 |
| 4,548,716 | 10/1985 | Boeve | 210/900 |
| 4,808,287 | 2/1989 | Hark | 210/900 |
| 5,518,624 | 5/1996 | Filson et al. | 210/900 |

FOREIGN PATENT DOCUMENTS

| 4-71624 | 6/1992 | Japan . |
| 6-31272 | 2/1994 | Japan . |
| 2249307 | 5/1992 | United Kingdom . |
| 2145709 | 4/1995 | United Kingdom . |
| 2295822 | 6/1996 | United Kingdom . |

OTHER PUBLICATIONS

Characterization of a Boron–Specific Ion Exchange Resin (Amberlite IRA–743) Robert Kunin and Albert F. Preuss vol. 3 No. 4 pp. 304–306.

Amberlite IRA–743 Ion Exchange Resin Rohm and Haas Company 1989.

Primary Examiner—Ivars Cintins
Attorney, Agent, or Firm—Fish & Richardson P.C.

[57]          ABSTRACT

A high-purity water producing apparatus has an excellent effect of environmental protection and is also capable of effectively removing boron. It comprises a pretreatment unit, and a double pass RO unit an EDI unit or a distillation unit or any combination thereof as principal deionization unit(s) but does not comprise any chemical-regeneration type ion exchanger. It further comprises a boron removing unit and the water treated by the principal deionization unit(s) is brought into contact with a boron-selective ion exchange resin.

7 Claims, 7 Drawing Sheets

HIGH-PURITY WATER PRODUCING APPARATUS UTILIZING BORON-SELECTIVE ION EXCHANGE RESIN

BACKGROUND OF THE INVENTION

1. Field of the Invention

This invention relates to a high-purity water producing apparatus suitable for use in the electronic industry and the like. For the purpose of the invention, "high-purity water" refers to highly pure water including so-called deionized water, ultrapure water and ultrahigh-purity water that can be produced by removing suspended solids, ions and non-ionic substances to an achievable extreme extent.

2. Prior Art

There has been a large demand for high-purity water in various industrial fields including the semiconductor device manufacturing industry, the pharmaceutical industry and the food processing industry, and a number of high-purity water producing apparatus have been proposed to meet this demand. Such apparatus include those comprising a pretreatment unit for removing suspended solids contained in raw water, a deionization unit for removing ions from pretreated water and a non-ionic substance removing unit for removing non-ionic substances from pretreated water.

However, currently available high-purity water producing apparatus have certain drawbacks. Firstly, there is a problem of high initial cost and high running cost that need to be reduced as much as possible, as is the case with other plants and equipment used in the industry. Secondly, there is a problem that the amount of waste water produced as a by-product of the process of producing high-purity water has to be reduced from the viewpoint of environmental protection. High-purity water producing apparatus that do not comprise any chemical-regeneration type ion exchange unit have been attracting attention in recent years as they can address the above problems. In those apparatus, the conventional chemical-regeneration type ion exchange unit is replaced by a reverse osmosis membrane unit, an electro-deionization unit (hereinafter referred to as an "EDI" unit) or a distillation unit that utilizes waste heat.

These new apparatus compare favorably with the conventional apparatus in that they do not require a regeneration unit and therefore do not produce waste water that normally contains salts to a considerably high concentration so that the plant having such an apparatus may do with a small facility for waste water treatment to consequently reduce the cost of waste water disposal and enhance the effect of environmental protection.

Apart from the above discussed problems, it has been found as a result of recent developments of analysis techniques that high-purity water produced from a high-purity water producing apparatus comprising a pretreatment unit, a deionization unit and a non-ionic substance removing unit is accompanied by a problem of containing boron at a significant concentration. This is considered to be a problem that must be seriously dealt with.

Boron contained in high-purity water attracted little attention in the past but, as it has become known that boron contained in high-purity water is a problem, currently there is a demand for means and measures for removing boron from high-purity water. Problems that have been pointed out for high-purity water with boron contained to a significant concentration include the following. The threshold voltage of an n-channel transistor formed on a substrate depends on the boron concentration of the substrate. Thus, the use of high-purity water containing boron to a high concentration level for cleaning wafers makes it difficult to control the boron concentration of the substrate and can result in the production of defective devices. Additionally, while minute n-channel MOS transistors have been designed and manufactured in response to a higher degree of integration for semiconductor devices, the manufacture of such minute devices requires the distribution pattern of boron concentration across the depth of the substrate to be accurately controlled in order to prevent a punch through effect from appearing. This in turn requires the use of high-purity water with a sufficiently low boron concentration in the course of manufacturing the devices. In the pharmaceutical industry, on the other hand, high-purity water to be used for manufacturing medicines is required to have a low concentration level for any impurities including boron. The boron contained in high-purity water has its origin in industrial water drawn from rivers and wells and containing boron to a concentration of several tens of ppb. While known apparatus for producing high-purity water is normally provided with a deionization unit, any existing deionization units cannot satisfactorily remove boron.

According to research carried out by the inventor of the present invention, while a high-purity water producing facility provided with a chemical-regeneration type ion exchange unit (for example a 2-bed type ion exchanger with a degasifier or a mixed-bed type ion exchanger) shows boron leakage in a relatively early stage of operation, the boron concentration of the high-purity water produced by such a facility can be reduced by increasing the frequency of the regenerating operation. On the other hand, the reverse osmosis membrane unit, the EDI unit and the distillation unit leak out boron respectively by about 60%, 25% and 65 on a constant basis so that it is practically impossible to satisfactorily remove boron from high-purity water by means of these units.

Thus, while known high-purity water producing apparatus comprising an EDI unit and some other deionization units have the advantages of not using any chemicals for regeneration, they are not suitable for producing boron-free high-purity water.

This problem will be discussed in greater detail by referring to FIG. 5 of the accompanying drawings which illustrates a known high-purity water producing apparatus comprising a non-chemical-regeneration type double pass RO unit. As shown in FIG. 5, the apparatus comprises a pretreatment unit 101 for removing suspended solids from feed water by coagulation/sedimentation/filtration or by suspended solids removal membrane, a decarbonator 102 for removing carbonic acid from the filtered water, where acid such as hydrochloric acid is added to the water and causes the latter to be exposed to air in an acidic atmosphere, although the water may be simply exposed to air without adding acid if it contains carbon dioxide to a large extent as in the case of underground water, and a double pass RO arrangement using a first reverse osmosis membrane unit 103 designed to eliminate ionic impurities and non-ionic organic substances and particles from the decarbonated water by adding alkali such as sodium hydroxide at the inlet port thereof to increase the pH of the water to a pH level of about 8.5 and turn the dissolved carbonic acid into bicarbonate ions and a second reverse osmosis membrane unit 104 for further treating the water after increasing the pH of the water to a pH level of about 9.5 by adding alkali at its inlet port.

The apparatus further comprises a vacuum degasifier 105 for expelling gases such as nitrogen, oxygen and carbon dioxide still contained in the water coming from the double pass RO unit and a non-regenerative type ion exchanger 106 containing a mixture of strongly acidic cation exchange resin and strongly basic anion exchange resin to produce primary deionized water having a specific resistivity of about 18 MΩ·cm.

While the primary deionized water produced by the apparatus as shown in FIG. 5 may be used as cooling water for manufacturing semiconductor devices, and water for washing quartz-made tools and other applications, it has to be forwarded to a secondary water deionizing system comprising a deionized water tank 107, an UV oxidizer 108, a cartridge polisher 109 and a membrane separation unit 110 to produce secondary deionized water to be sent to the points of use if high-purity water is to be used for washing silicon wafers. The series of units arranged upstream of the deionized water tank 107 is normally referred to as the primary water deionizing system. In the secondary water deionizing system, the UV oxidizer 108 decomposes organic substances into organic acids and carbonic acid and the cartridge polisher 109 removes organic acids and carbonic acid as well as other impurities contained to a small extent, whereas the membrane separation unit 110 removes fine particles from the water by means of an ultrafiltration membrane, micronic filtration membrane or reverse osmosis membrane. Note that the deionized water tank 107, the UV oxidizer 108, the cartridge polisher 109 and the membrane separation unit 110 are arranged to form a closed loop so that high-purity water may be constantly circulating there until drawn into any point of use in order to protect it against contamination by bacteria that occurs when water becomes stagnant.

While the known high-purity water producing apparatus of FIG. 5 which is a non-regenerative type apparatus having a configuration as described above and comprising a double pass RO unit as its principal deionization unit is advantageous in that it does not use any regenerating chemicals, it inevitably leaks out boron at a level of ppb from the initial stages of operation as shown in Table 1 below to make it inappropriate for producing boron-free deionized water. The boron concentrations listed in Table 1 are determined by means of an ICP-MS (inductively coupled plasma mass spectrometer).

degasifier 105 is replaced by a membrane degasifier 122. Since the remaining components of this apparatus are identical with their respective counterparts of the apparatus of FIG. 5, they are denoted by the same reference numerals and will not be described any further. This non-chemical-regeneration type high-purity water producing apparatus comprising an EDI unit, again, leaks out boron of a ppb concentration level at the exit of the most downstream membrane separation unit 110 as shown in Table 2.

FIG. 7 illustrates still another known high-purity water producing apparatus realized by replacing the double pass RO arrangement of units 103 and 104 by an RO unit 130 and a distillation unit 131 and a membrane degasifier 132 is placed upstream of the UV oxidizer 108 in the secondary water deionizing system. Otherwise, the apparatus has a configuration the same as that of FIG. 5, and therefore the components are denoted by the same reference numerals and will not be described any further. This known deionized water producing apparatus comprising a distillation unit 131, again, leaks out boron of a ppb concentration level at the exit of the most downstream membrane separation unit 110 as shown in Table 1.

In view of the above observations, if can be seen that any non-regeneration type high-purity water producing apparatus comprising a reverse osmosis membrane unit, an EDI unit or a distillation unit as a principal deionization unit has little effect on removing boron, although such apparatus is effective for cost reduction and environmental protection.

SUMMARY OF THE INVENTION

It is therefore the object of the invention to provide a non-regeneration type high-purity water producing apparatus having a characteristic feature of known similar apparatus of being free from the problem of waste liquid disposal and hence having an excellent effect of environmental protection and also being capable of effectively removing boron which is a contaminant attracting particular attention in recent years.

According to the invention, the above object is achieved by providing a high-purity water producing apparatus comprising a pretreatment unit and a deionization unit respectively for removing suspended solids and ions contained in

TABLE 1

| Point of analysis | Raw water | EDI unit outlet | Distillation unit outlet | Double pass RO unit outlet | Non-regeneration type ion exchanger outlet | Membrane separation |
|---|---|---|---|---|---|---|
| No. 1 conventional apparatus (FIG. 5) | 53 ppb | — | — | 24 ppb | 15 ppb | 7 ppb |
| No. 2 conventional apparatus (FIG. 6) | 53 ppb | 8 ppb | — | — | 5 ppb | 3 ppb |
| No. 3 conventional apparatus (FIG. 7) | 53 ppb | — | 21 ppb | — | 13 ppb | 8 ppb |

FIG. 6 illustrates another known high-purity water producing apparatus, which differs from the apparatus of FIG. 5 in that the decarbonator 102 of FIG. 5 is omitted and the first and second reverse osmosis membrane units 103 and 104 of the double pass RO arrangement are replaced by an RO unit 120 and an EDI unit 121, while the vacuum raw water, wherein said deionization unit includes at least a double pass RO unit, an electrodeionization type ion exchanger or a distillation unit or any combination thereof and the apparatus additionally comprises a boron removing unit placed downstream of the deionization unit for bringing the water treated by the deionization unit(s) into contact with a boron-selective ion exchange resin.

Any boron-selective ion exchange resin can be used for the purpose of the present invention so long as it selectively adsorbs boron. Specific examples of such boron-selective ion exchange resin include AMBERLITE (trade name: available from Rome and Haas Company), IRA-743T and DIAION CRB02 (trade names: available from Mitsubishi Chemical Industries Co., Ltd.) prepared by introducing polyvalent alcohol groups as functional groups. It is a prerequisite for a high-purity water producing apparatus according to the invention to use a boron-selective ion exchange resin. Since a known high-purity water producing apparatus using the standard strongly basic anion exchange resin can start leaking out boron at a high concentration very quickly, the ion exchange resin has to be replaced very frequently if the resin is of the non-regeneration type or it has to be chemically regenerated very frequently if it is of the regeneration type. Thus, in any case, such a known non-regeneration type high-purity water producing apparatus comprising a reverse osmosis membrane unit, an EDI unit or a distillation unit or a combination thereof as a principal deionizing component(s) may lose its advantages when the strongly basic anion exchange resin (regeneration type) is employed for the purpose of boron removal.

For the purpose of the present invention, "bring water into contact with" boron-selective ion exchange resin refers to feeding water to an ion exchanger column filled with boron-selective ion exchange resin. Such an ion exchanger column may also contain ion exchange resin of some other type in the form of a mixture or in different layers. While an apparatus according to the invention is not subject to any particular structural limitations, the use of a chemical-regeneration type boron removing unit undermines the merit of an otherwise non-regeneration type high-purity water producing apparatus. Thus, a boron removing unit is preferably placed downstream of the reverse osmosis membrane unit, the EDI unit or the distillation unit or a combination thereof. More specifically, it should better be placed at the downstream end of the primary water deionizing system (directly upstream of the deionized water tank) or in the secondary water deionizing system.

Preferably, a pretreatment unit should be arranged upstream of the deionization unit. It may be of any type such as in-line coagulation/coagulation/sedimentation, filtration, filtration, active carbon filtration or suspended solids removal membrane.

A high-purity water producing apparatus according to the invention comprises at least a double pass RO unit, an EDI unit or a distillation unit or a combination thereof for deionization and, additionally, it may comprise a non-regeneration type ion exchanger. If a non-regeneration type ion exchanger is used, it should preferably be placed downstream of the double pass RO unit, the electro-regeneration type deionization unit or the distillation unit or a combination thereof in order to minimize the frequency of replacement of the ion exchanger.

Since the boron-selective ion exchange resin in the above arrangement may leak out organic substances to a significant extent, a UV oxidizer designed to decompose organic substances and a membrane separation unit such as a reverse osmosis membrane unit designed to remove the decomposition products may preferably be placed downstream of the boron removing unit.

While certain arrangements for post-treatment are preferable to maximize the effect of installing a boron removing unit as described above, a high-purity water producing apparatus according to the invention may otherwise have any configuration as a non-regeneration type apparatus, such as the one illustrated in any of FIGS. 5 through 7, without limitations.

For the purpose of the invention, double pass RO is an arrangement where the water coming from a first RO unit (reverse osmosis membrane unit) is treated by a second RO unit to produce high-purity water. In addition to a simple two stage arrangement of RO units, an arrangement of regulating the pH level of the water coming from the first RO unit to improve the efficiency of removing free carbon dioxide from the water (as disclosed in Japanese Patent Application Laid-Open No. Hei 6-31272) may also be used for the purpose of the invention.

For the purpose of the invention, an EDI unit refers to any known deionized water producing unit having a configuration as described below. In an EDI unit, a mixture of anion exchange resin and cation exchange resin or a mixture of anion exchange fiber and cation exchange fiber is filled in the space between a cation exchange membrane and an anion exchange membrane in a deionization chamber and feed water is made to pass through the ion exchange layer, while a DC current is applied perpendicularly to the flowing water by way of the ion exchange membranes to electrically transfer ions contained in the flowing water into the concentrate brine flowing outside the ion exchange membranes in order to produce deionized water (as disclosed in Japanese Patent Application Laid-Open No. 4-71624).

For the purpose of the invention, a distillation unit is a unit for producing distilled water by means of a known ordinary distillation method. Known distillation units for producing highly pure distilled water include a distilled water producing unit using a multi-effect distillation technique (such as the one available from Organo Aqua) and MIRACLE PURE SERIES (trade name: Hitachi Shipbuilding and Engineering).

Thus, a high-purity water producing apparatus according to the invention can solve a serious problem which otherwise constrains the areas of application of any non-regeneration type apparatus by removing boron contained in raw water by means of a boron removing unit and, therefore, maximally exploit the advantage of a non-regeneration type apparatus comprising a reverse osmosis membrane unit, an EDI unit or a distillation unit or a combination thereof.

DETAILED DESCRIPTION OF THE INVENTION

Now, the present invention will be described by referring to the accompanying drawings that illustrate preferred embodiments of the invention.

Embodiment 1

Figure 1:
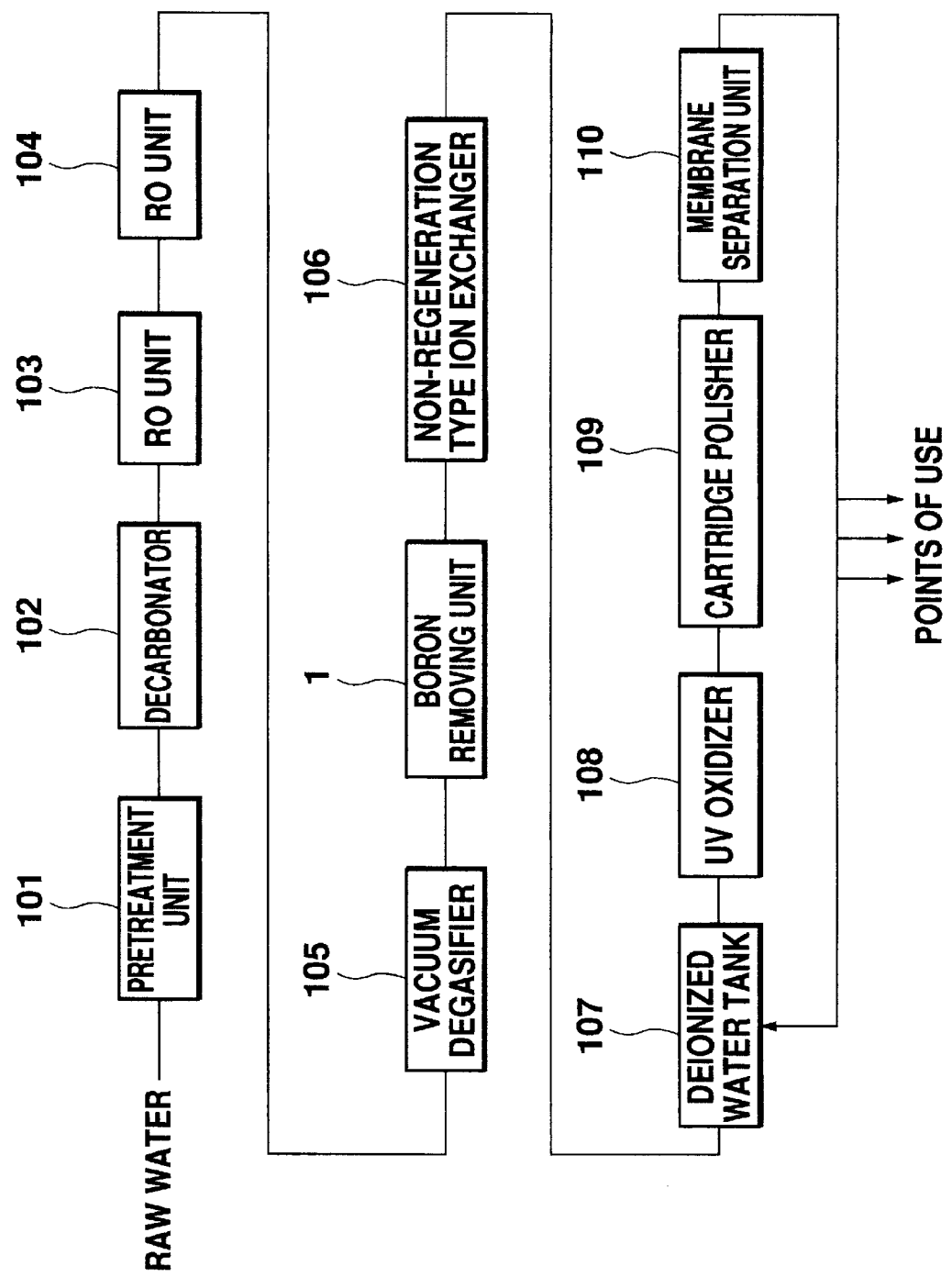
FIG. 1 is a flow chart showing the configuration of an embodiment of high-purity water producing apparatus according to the invention and comprising a non-regeneration type double pass RO unit as a principal deionization unit.

FIG. 1 is a flow chart showing the configuration of a first embodiment of high-purity water producing apparatus according to the invention and comprising a boron removing unit 1 that contains boron-selective resin (AMBERLITE IRA-743T: see above) and is placed between a vacuum degasifier 105 and a non-regeneration type ion exchanger 106.

This embodiment comprises a pretreatment unit 101 for removing suspended solids from raw water by coagulation/sedimentation/filtration or by suspended solids removal membrane, a decarbonator column 102 for removing carbonic acid from the filtered water, where acid such as hydrochloric acid is added to the water as necessary and causes the latter to be exposed to air in an acidic atmosphere, and a double pass RO arrangement using a first reverse osmosis membrane unit 103 designed to eliminate ionic impurities and non-ionic impurities such as organic substances and particles from the decarbonated water and a second reverse osmosis membrane unit 104 for further removing impurities. If necessary, the pH level of the water to be treated by RO may be regulated by adding an alkali agent such as sodium hydroxide as in the case of conventional apparatus mentioned earlier.

The embodiment further comprises a vacuum degasifier 105 for expelling gases such as nitrogen, oxygen and carbon dioxide still contained in the water coming from the double pass RO unit and a boron removing unit 1 containing boron-selective resin and placed downstream of the vacuum degasifier 105. Then, there is a non-regenerative type ion exchanger 106 containing a mixture of strongly acidic cation exchange resin and strongly basic anion exchange resin to produce primary deionized water having a resistivity of about 18 MΩ·cm and a reduced boron concentration of <10 ppt.

The produced primary deionized water is forwarded to a secondary water deionizing system comprising a deionized water tank 107, an UV oxidizer 108, a cartridge polisher 109 and a membrane separation unit 110 to produce secondary deionized water to be sent to the point of use.

For the purpose of the invention, a non-regeneration type ion exchanger 106 is preferably placed downstream of a boron removing unit 1, as in the above described embodiment, because the TOC (total organic carbon) leached from the AMBERLITE IRA-743T filled in the boron removing unit can be removed by the non-regeneration type ion exchanger.

Thus, the above embodiment that does not comprise any chemical-regeneration type deionization unit but comprises a double pass RO unit for deionization can effectively produce boron-free high-purity water continuously for a long time without generating any chemical regenerant wastes, thereby fully exploiting the advantages of a non-regeneration type apparatus.

Embodiment 2

Figure 2:
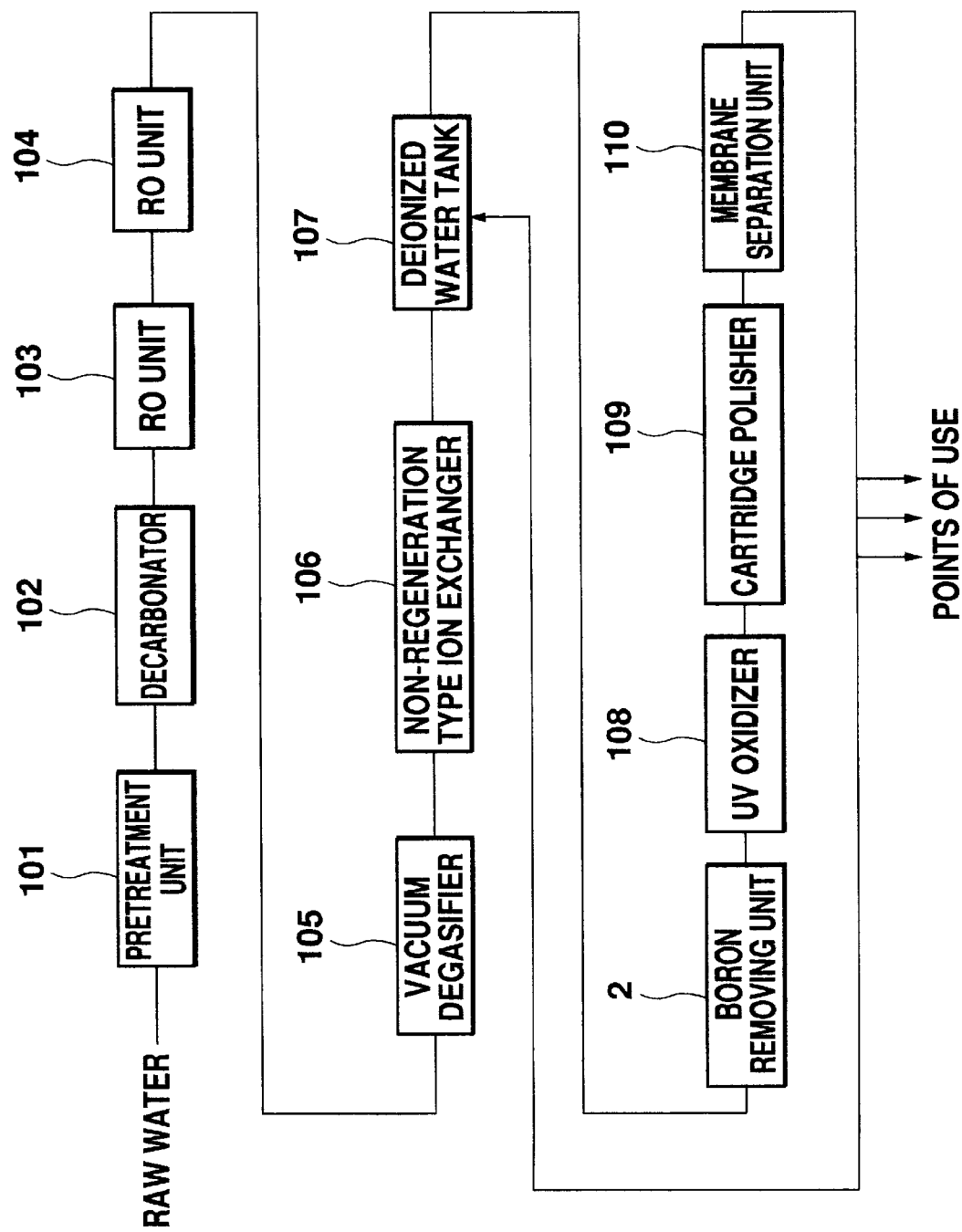
FIG. 2 is also a flow chart showing the configuration of another embodiment of high-purity water producing apparatus according to the invention and comprising a non-regeneration type double pass RO unit as a principal deionization unit.

FIG. 2 is a flow chart showing the configuration of a second embodiment of high-purity water producing apparatus according to the invention. This embodiment differs from the first embodiment of FIG. 1 in that the boron removing unit 1 (in FIG. 1) filled with AMBERLITE IRA-743T is moved to between the deionized water tank 107 and the UV oxidizer 108 and is denoted by reference numeral 2. Otherwise, this embodiment is exactly the same as the first embodiment.

This embodiment is advantageous over the first embodiment in that the anion concentration of the deionized water sent to the boron removing unit is even lower than that of the corresponding deionized water produced by the first embodiment, disregarding the negative boron ions, because the boron removing unit 2 is placed downstream of the deionized water tank 107 in the secondary water deionizing system. While the resistivity of the water flowing into the boron removing unit 1 of the first embodiment is about 5 MΩ·cm, that of the water flowing into the boron removing unit 2 of the second embodiment is greater than 18 MΩ·cm, meaning that the latter boron removing unit can be used for a prolonged period of time (about four times longer on the basis of the above resistivities) due to the reduced loading imposed on the boron-selective ion exchange resin contained in it.

Embodiment 3

Figure 3:
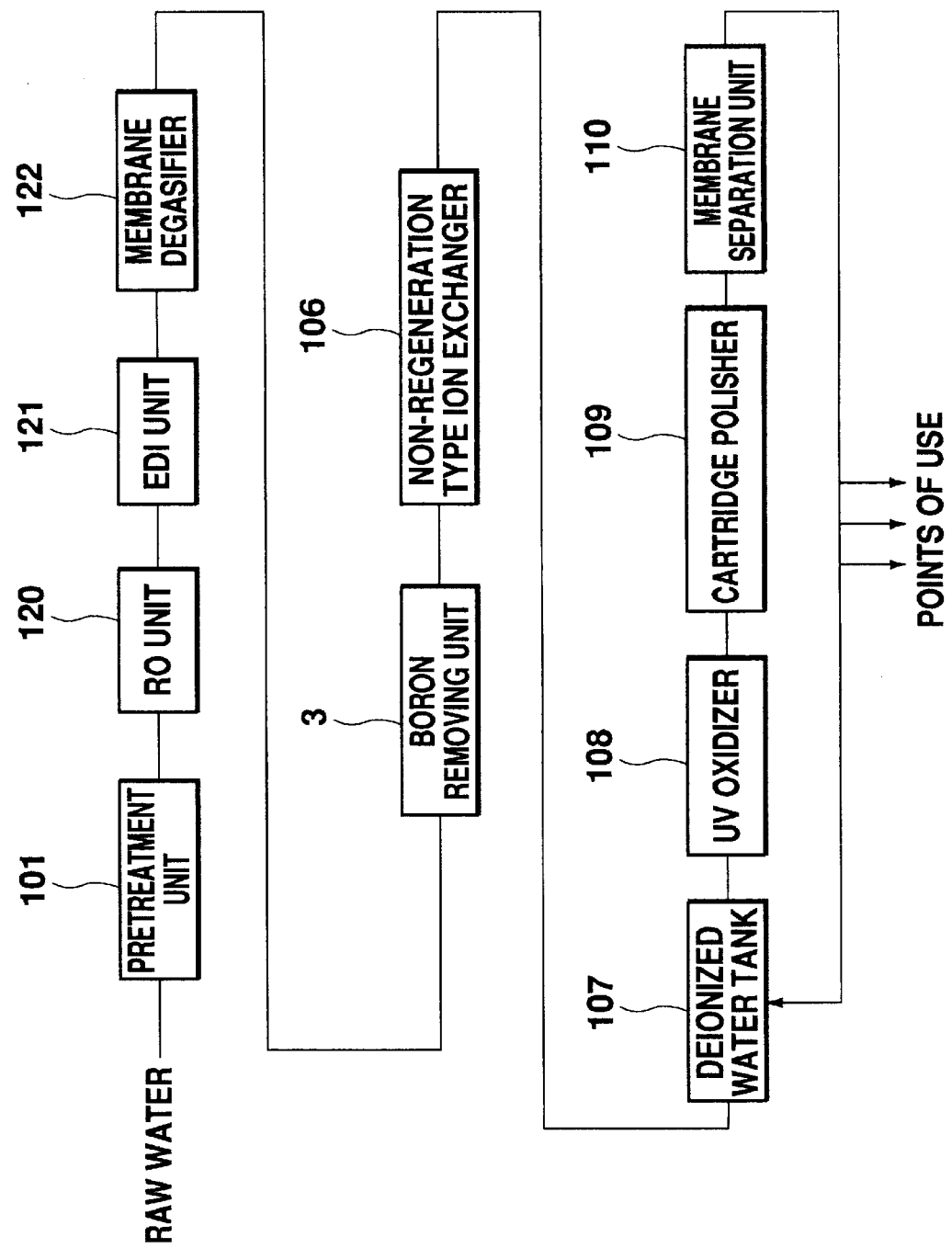
FIG. 3 is a flow chart showing the configuration of still another embodiment of high-purity water producing apparatus according to the invention and comprising a non-regeneration type EDI unit as a principal deionization unit.
Figure 6:
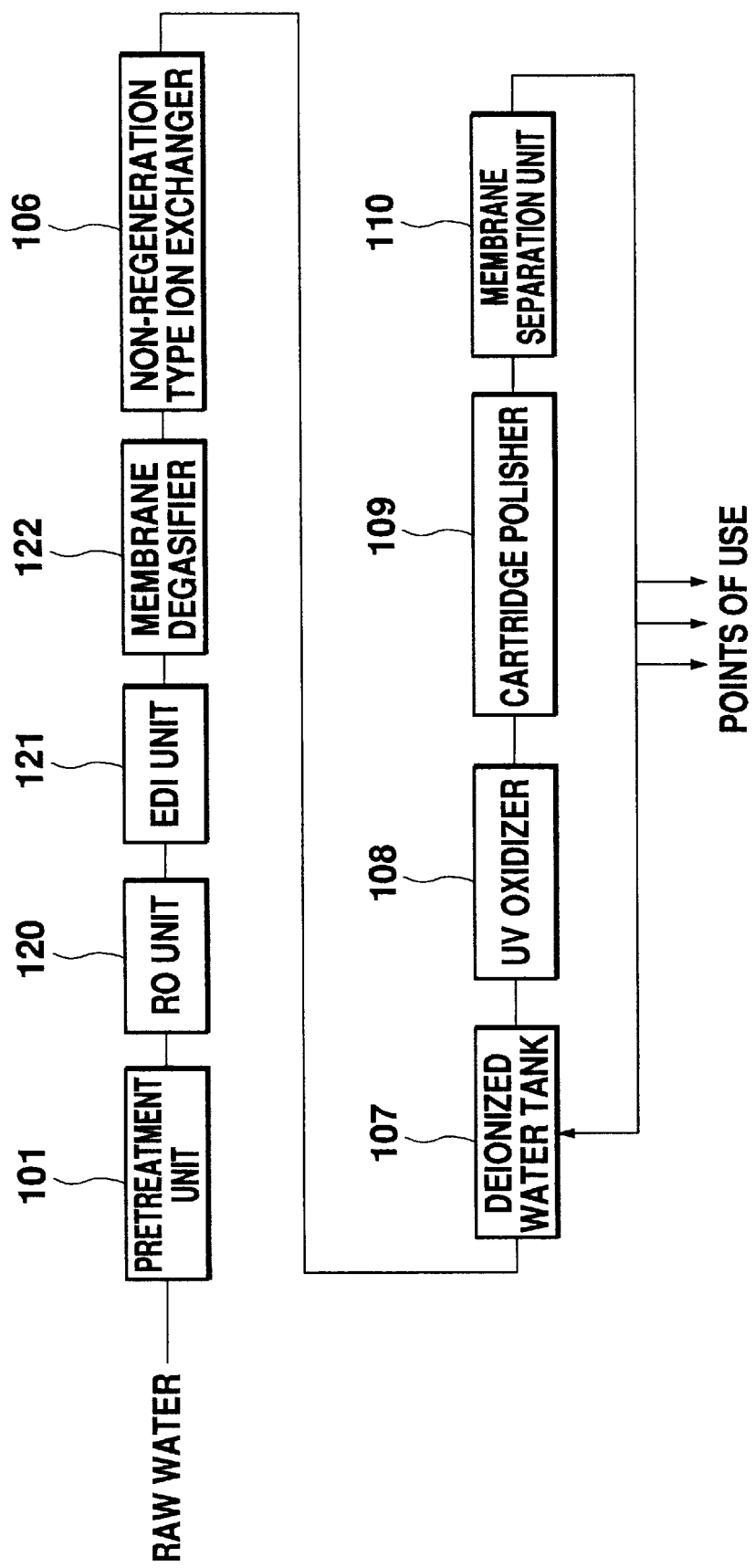
FIG. 6 is a flow chart showing the configuration of another conventional high-purity water producing apparatus comprising a non-regeneration type EDI unit as a principal deionization unit.

FIG. 3 is a flow chart showing the configuration of a third embodiment of high-purity water producing apparatus according to the invention. This embodiment can be realized by arranging a boron removing unit 3 filled with AMBERLITE IRA-743T between the membrane degasifier 122 and the non-regeneration type ion exchanger 106 of the known primary water deionizing system of FIG. 6.

Since this embodiment comprises an EDI unit 121 as a principal deionization unit and does not have any chemical-regeneration type deionization unit, it can produce boron free high-purity water continuously for a prolonged period of time, while exploiting the advantages of a non-regeneration type apparatus.

The boron removing unit 3 may alternatively be placed between the deionized water tank 107 and the UV oxidizer 108 of the secondary water deionizing system. Such an arrangement can further prolong the service life of the boron removing unit 3 for the reason discussed above with reference to the second embodiment.

Embodiment 4

Figure 4:
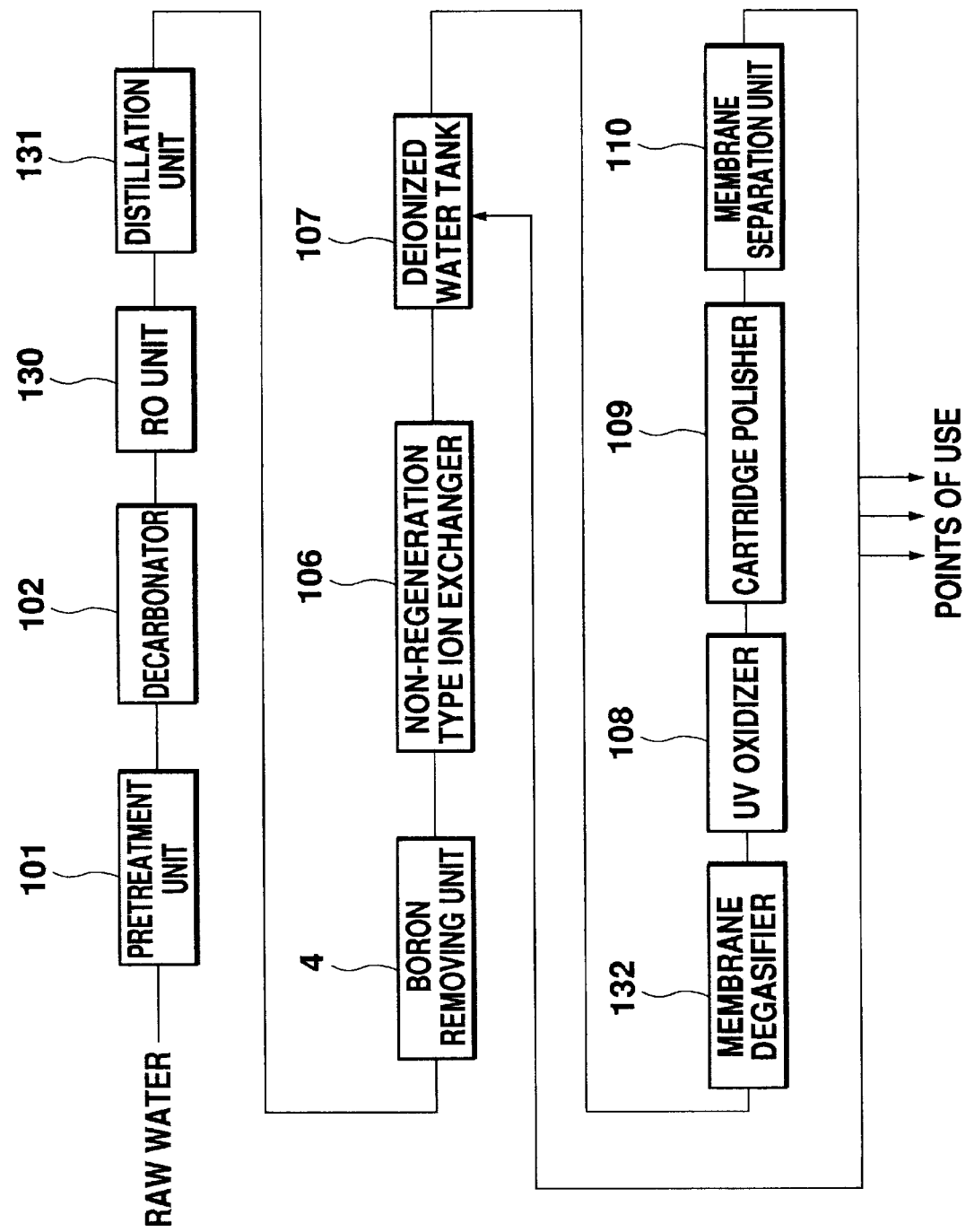
FIG. 4 is a flow chart showing the configuration of still another embodiment of high-purity water producing apparatus according to the invention and comprising a non-regeneration type distillation unit as a principal deionization unit.
Figure 5:
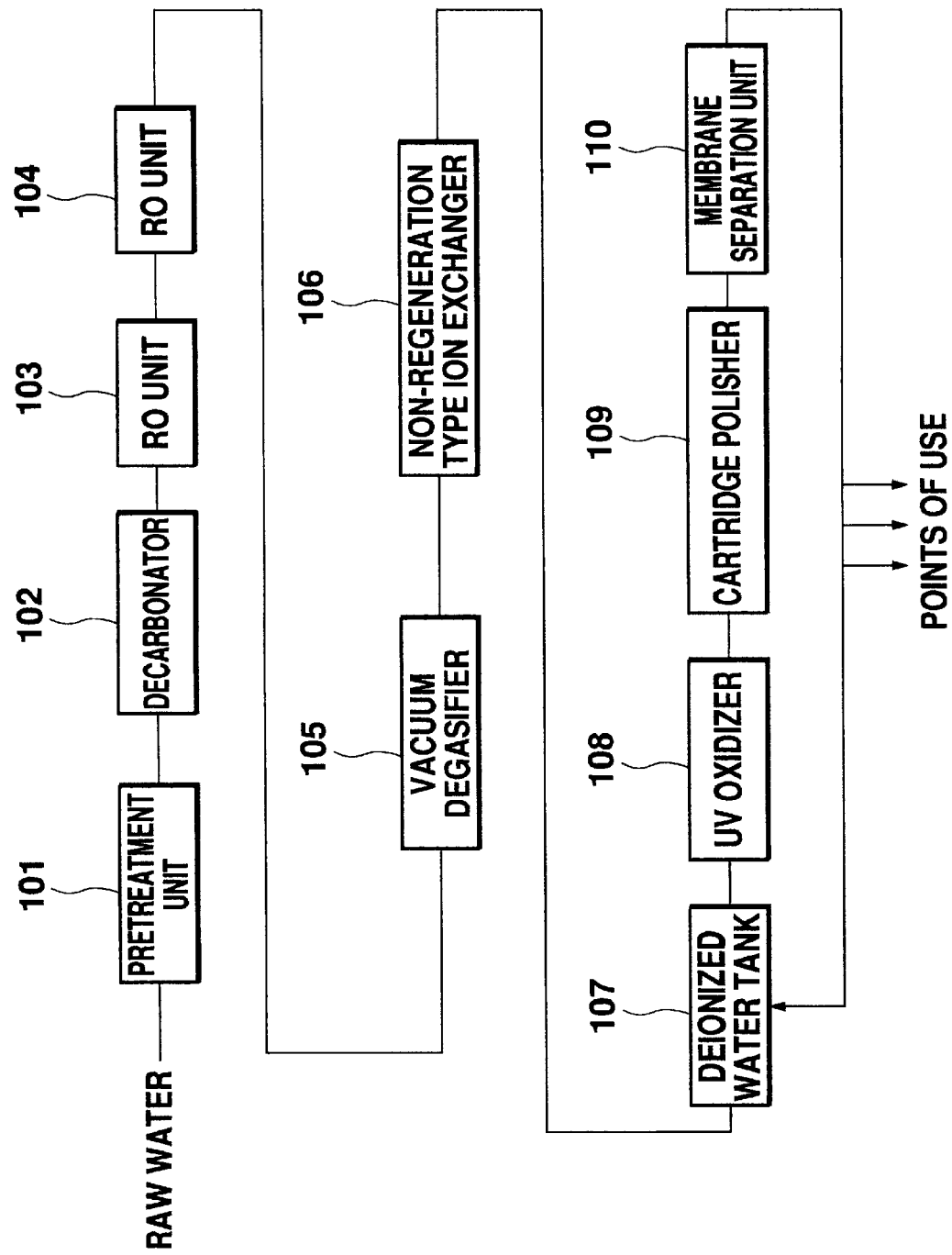
FIG. 5 is a flow chart showing the configuration of a conventional high-purity water producing apparatus comprising a non-regeneration type double pass RO unit as a principal deionization unit.
Figure 7:
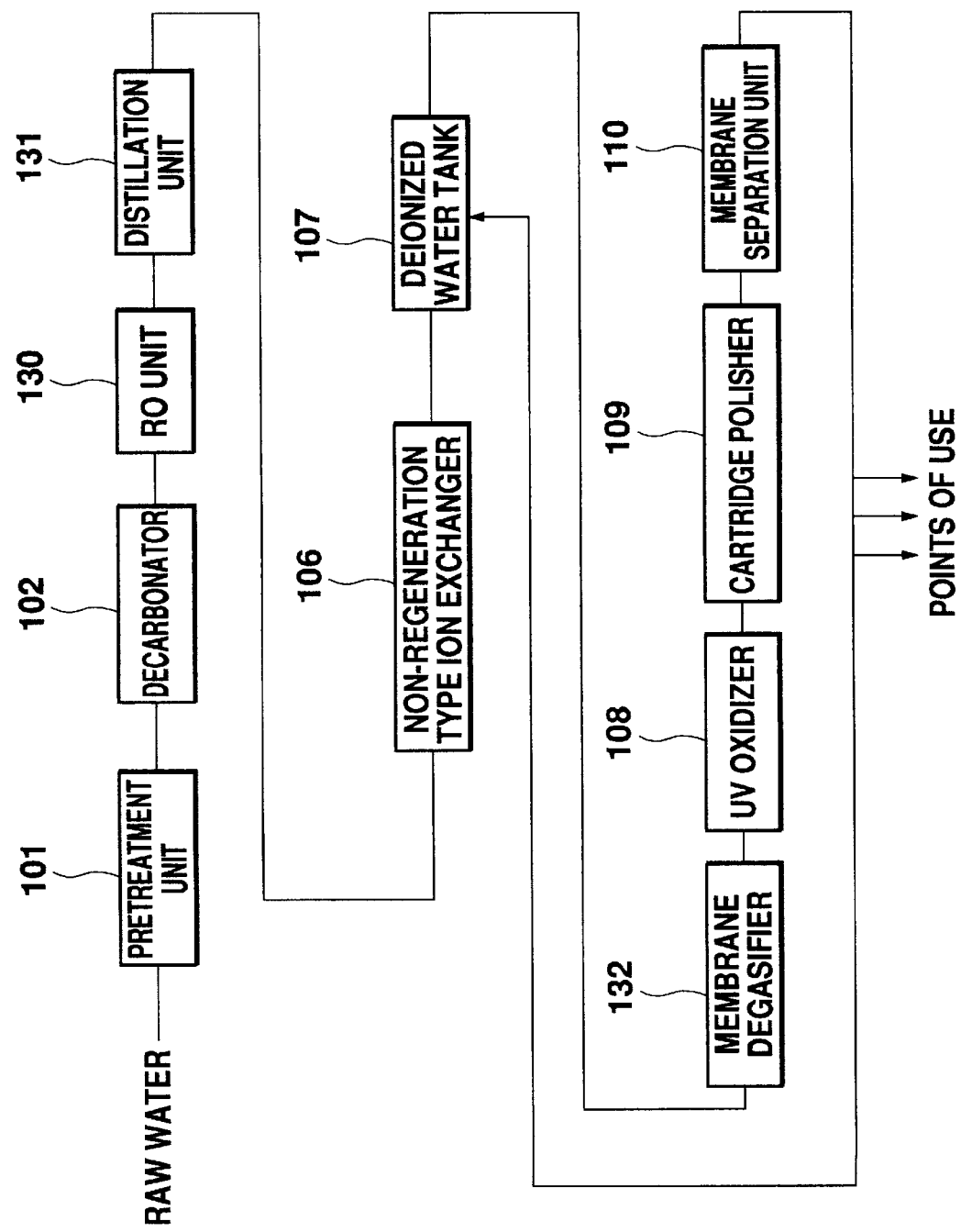
FIG. 7 is a flow chart showing the configuration of still another conventional high-purity water producing apparatus comprising a non-regeneration type distillation unit as a principal deionization unit.

FIG. 4 is a flow chart showing the configuration of a fourth embodiment of high-purity water producing apparatus according to the invention. This embodiment can be realized by placing a boron removing unit 4 filled with AMBERLITE IRA-743T between the distillation unit 131 and the non-regeneration type ion exchanger 106 of the conventional primary water deionizing system of FIG. 7.

Since this embodiment comprises a distillation unit 131 as a principal deionization unit and does not have any chemical-regeneration type deionization unit, it can produce boron free high-purity water continuously for a prolonged period of time, while exploiting the advantages of a non-regeneration type apparatus.

The boron removing unit 4 may alternatively be placed between the deionized water tank 107 and the UV oxidizer 108 of the secondary water deionizing system. Such an arrangement can further prolong the service life of the boron removing unit 4 for the reason discussed above with reference to the second embodiment.

[EXAMPLES]

Example 1

The arrangement of FIG. 1 and the following specific treatment units were used. The treated water at each of various sampling points was analyzed for boron concentration by means of an ICP-MS analyzer. Unit Arrangement:

pretreatment unit 101: coagulation/sedimentation/filtration unit decarbonator 102: column packed with packing media and aerated up flow double pass RO arrangement:

RO unit 103: NTR-759HR available from Nitto Denko

RO unit 104: NTR-759HR available from Nitto Denko vacuum degasifier: column packed with packing media and vacuum suction from above boron removing unit 1: AMBERLITE IRA-743T single bed type unit (water flow rate SV 50)

non-regeneration type ion exchanger 106: a mixed bed charged with a volume ratio of 1/1 of strongly acidic cation exchange resin and strongly basic anion exchange resin (water flow rate SV 30)

UV oxidizer 108: TFL-6; 0.35 KW-Hr/m3 available from Chiyoda Kohan cartridge polisher 109: a mixed bed charged with a volume ratio of 1/1 of strongly acidic cation exchange resin and strongly basic anion exchange resin (water flow rate SV 50)

ultrafiltration membrane unit 110: OLT-3026 available from Asahi Chemical Industry boron concentration of raw water: 53 ppb flow rate: 50m3/Hr, duration: 60 days Table 2 below summarizes the results (at the end of 60-day service).

analyzed for boron concentration at various points by means of an ICP-MS analyzer. The results are summarized in Table 2.

As seen from Table 2, a low boron concentration of <10 ppt was achieved at the exit of the ultrafiltration membrane unit 110. With a continuous operation, the arrangement of this example proved to be effective for about four times as long as the counterpart of Example 1 for boron filtration.

Example 3

The arrangement of FIG. 3 and the specific treatment units as listed in Example 1 were used except that the RO unit 120, the EDI unit 121 and the membrane degasifier 122 were selected as follows. The treated water was analyzed for boron concentration at various points by means of an ICP-MS analyzer. The results are summarized in Table 2.

RO unit 120: NTR-759HR available from Nitto Denko

EDI unit 121: EDI-10 available from Organo Corporation membrane degasifier 122: MJ-510P available from Organo Corporation As seen from Table 2, a low boron concentration of <10 ppt was achieved at the exit of the non-regeneration type ion exchanger 106 of the primary water deionizing system.

Example 4

The arrangement of FIG. 4 and the specific treatment units as listed in Example 1 were used except that the RO unit 130, the distillation unit 131 and the membrane degasifier 132 were selected as follows. The treated water was analyzed for boron concentration at various points by means of an ICP-MS analyzer. The results are summarized in Table 2.

RO unit 130: NTR-759HR available from Nitto Denko distillation unit 131: Multi-Effect Water Distiller available from Organo Aqua membrane degasifier 132: MJ-510P available from Organo Corporation As seen from Table 2, a low boron concentration of <10 ppt was achieved at the exit of the non-regeneration type ion exchanger 106 of the primary water deionizing system.

What is claimed is:

1. A high-purity water producing apparatus comprising a pretreatment unit and a deionization unit for respectively removing suspended solids and ions contained in raw water, wherein:

said deionization unit is a non-regeneration-type apparatus that includes at least one unit selected from the

TABLE 2

| Point of analysis | Raw water | EDI unit outlet | Distillation unit outlet | Double pass RO unit outlet | Non-generation type ion exchanger outlet | Membrane separation unit outlet |
|---|---|---|---|---|---|---|
| Example 1 | 53 ppb | — | — | 24 ppb | <10 ppt | <10 ppt |
| Example 2 | 53 ppb | — | — | 24 ppb | 15 ppb | <10 ppt |
| Example 3 | 53 ppb | 8 ppb | — | — | <10 ppt | <10 ppt |
| Example 4 | 53 ppb | — | 21 ppb | — | <10 ppt | <10 ppt |

As seen from Table 2, a low boron concentration of <10 ppt was achieved at the exit of the non-regeneration type ion exchanger 106 of the primary water deionizing system.

Example 2

The arrangement of FIG. 2 and the specific treatment units as listed in Example 1 were used. The treated water was group consisting of a double pass RO unit, an electro-deionization unit and a distillation unit;

the apparatus additionally comprises a boron removing unit placed downstream of the deionization unit for bringing the water treated by the deionization unit into contact with a boron-selective ion exchange resin and reducing the concentration of boron in the water to less than 10 ppt.

2. A high-purity water producing apparatus according to claim 1, wherein:

it further comprises a non--regeneration type ion exchanger placed downstream of the boron removing unit for further treating the water treated by the boron removing unit.

3. A high-purity water producing apparatus according to claim 2, wherein:

said deionization unit, said boron removing unit and said non-regeneration type ion exchanger constitute a primary water deionizing system; and a secondary water deionizing system is placed downstream of the primary water deionizing system for further removing residual ions, non-ionic substances and fine particles.

4. A high-purity water producing apparatus according to claim 3, wherein:

said secondary water deionizing system comprises: a UV oxidizer for oxidizing and decomposing organic substances;

a cartridge polisher for removing oxidation products of organic substances; and a membrane separation unit for removing fine particles.

5. A high-purity water producing apparatus according to claim 1, wherein:

a non-regeneration type ion exchanger is placed between said deionization unit and said boron removing unit to feed the boron removing unit with water treated by the non-regeneration type ion exchanger.

6. A high-purity water producing apparatus according to claim 5, wherein:

said deionization unit and said non-regeneration type ion exchanger constitute the primary water deionizing system; and a secondary water deionizing system is placed downstream of the primary water deionizing system for further removing residual ions, non-ionic substances and fine particles;

said boron removing unit being incorporated in the secondary water deionizing system.

7. A high-purity water producing apparatus according to claim 6, wherein:

said secondary water deionizing system comprises:

an UV oxidizer for oxidizing and decomposing organic substances; a cartridge polisher for removing oxidation products of organic substances; and a membrane separation unit for removing fine particles;

said boron removing unit being placed upstream of the UV oxidizer.

* * * * *

UNITED STATES PATENT AND TRADEMARK OFFICE
CERTIFICATE OF CORRECTION

PATENT NO. : 5,833,846

DATED : November 10, 1998

INVENTOR(S) : Madoka TANABE et al.

It is certified that error appears in the above-identified patent and that said Letters Patent is hereby corrected as shown below:

On the title page, Item [73], please change "Orango" to --Organo--.

Signed and Sealed this

Twenty-third Day of March, 1999

Attest:

Q. TODD DICKINSON

Attesting Officer

Acting Commissioner of Patents and Trademarks